US007248954B2

(12) United States Patent
Chinnadurai et al.

(10) Patent No.: US 7,248,954 B2
(45) Date of Patent: Jul. 24, 2007

(54) INTEGRATED CIRCUIT VEHICLE DIAGNOSTICS INTERFACE ADAPTER APPARATUS AND METHOD

(75) Inventors: Manokar Chinnadurai, Owatonna, MN (US); Eric Vande Zande, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 310 days.

(21) Appl. No.: 11/086,245

(22) Filed: Mar. 23, 2005

(65) Prior Publication Data

US 2006/0217855 A1 Sep. 28, 2006

(51) Int. Cl.
*G01M 17/00* (2006.01)
*G21C 17/00* (2006.01)

(52) U.S. Cl. ............................ 701/29; 701/33; 701/36; 702/183

(58) Field of Classification Search .................. 701/29, 701/33, 36; 702/182, 183
See application file for complete search history.

(56) References Cited

U.S. PATENT DOCUMENTS

| | | | | |
|---|---|---|---|---|
| 5,916,287 | A * | 6/1999 | Arjomand et al. | 701/29 |
| 5,922,037 | A * | 7/1999 | Potts | 701/29 |
| 6,134,488 | A * | 10/2000 | Sasaki et al. | 701/31 |
| 6,236,917 | B1 | 5/2001 | Liebl et al. | 701/29 |
| 6,538,472 | B1 | 3/2003 | McGee | 326/82 |
| 6,640,166 | B2 | 10/2003 | Liebl et al. | 701/29 |
| 6,662,087 | B1 | 12/2003 | Liebl et al. | 701/29 |
| 6,874,680 | B1 | 4/2005 | Klaus et al. | 235/375 |

* cited by examiner

*Primary Examiner*—Y. Beaulieu
(74) *Attorney, Agent, or Firm*—Baker & Hostetler LLP

(57) ABSTRACT

An integrated circuit vehicle diagnostics interface adapter includes a semiconductor substrate with two integral gateway conductors. A set of paired switches on the substrate link any two of a first set of contacts to the gateway conductors, and another set of paired switches on the substrate link the two gateway conductors to any pair of a second set of contacts corresponding to a particular vehicle network communications protocol circuit in a vehicle diagnostics device. Both sets of switches are controlled by an integrated switch control module.

21 Claims, 3 Drawing Sheets

INTEGRATED CIRCUIT VEHICLE DIAGNOSTICS INTERFACE ADAPTER APPARATUS AND METHOD

FIELD OF THE INVENTION

The present invention relates generally to diagnostic equipment. More particularly, the present invention relates to an interface adapter for vehicle diagnostics tools.

BACKGROUND OF THE INVENTION

With the advent of the microprocessor, virtually all modern vehicles have come to utilize onboard computers to control and monitor engine and electrical system functions. Such vehicle onboard computers typically interface with a multiplicity of sensors and transducers, which continuously detect vehicle and engine operational parameters and provide representative electrical signals to the onboard computer. The data collected and processed by the onboard computer can be useful in the diagnosis of vehicle engine and electrical system malfunctions. Thus, the vehicle onboard computer typically includes a communication port connector that allows certain of the collected data to be transmitted to an independent computer analyzer, which may process the vehicle diagnostic data, store the vehicle diagnostic data, or present the vehicle diagnostic data in a visual format that can be interpreted by vehicle maintenance and repair technicians.

In conjunction with these technological developments, a variety of specialized computer analyzers, or vehicle diagnostic tools, have been developed and marketed to provide vehicle maintenance and repair technicians access to the vehicle diagnostic data available from the vehicle onboard computers. The current technology includes a variety of hand-held vehicle diagnostic tools with considerable processing capabilities, typically incorporating an integral display and capable of displaying the vehicle diagnostic data in a variety of graphical formats that allow vehicle technicians to view and interpret the data. Use of such vehicle diagnostic tools, frequently referred to as scan tools, has become the standard in vehicle diagnostics.

Because modern vehicles incorporate multiple electronic control modules to control the various vehicle systems, an onboard computer network is required to allow communication between the various electronic control modules. In order to facilitate the use of off-board test equipment, wiring harness connectors have been provided on vehicles to allow an off-board tester to be connected to an in-vehicle network. When computer control was introduced into the automotive industry, each manufacturer developed its own proprietary architecture and protocol for an in-vehicle network, and manufacturers had complete discretion to implement any communication connector with any combination of pin assignments. This proved inefficient and costly, so the various manufacturers collaborated to establish a set of standards for vehicle-based computer networks.

Subsequently, state, federal and foreign governments implemented legislation requiring network interface standards for On-Board Diagnostics (OBD). Generally, these statutes have required the adoption of a standard vehicle interface connector, or diagnostic link connector (DLC), for cars and light trucks sold in this country and much of the world, the Society of Automotive Engineers (SAE) J1962 connector. Since 1996, United States federal law and state laws require that the vehicle manufacturers equip vehicles with a sixteen-pin SAE J1962 connector, and that the in-vehicle network support at least one of several common network standards. As a result, most cars produced today include the J1962 connector as the diagnostic link between on-vehicle computers and off-vehicle test equipment, utilizing one or more network interface protocol standards.

Although the laws have standardized the connector, the current laws do not specify all of the pin assignments. As a result, even though virtually all cars and light trucks manufactured today have the same vehicle diagnostics connector, the various manufacturers continue to use different connector pin combinations to support communications with their in-vehicle networks. Thus, even though a vehicle diagnostic tester with a J1962 connector may be connected to virtually all vehicles manufactured since 1996, the data received on the individual connector pins differs from one vehicle manufacturer to another.

In order to address this issue, special vehicle diagnostics interface adapter harnesses have been developed that allow switching between the various connector pins on the vehicle interface and the off-board tester interface. However, in order to accommodate both pre-1996 vehicles and post-1996 vehicles, more than twenty different adapter harnesses may be required. In addition, in order to accommodate the various interface adapter harnesses, off-board test equipment inserts, such as the Smart System Inserts (SSI) made by the SPX Corporation of North Carolina, U.S.A. for use with its scan tools, or multiple discrete switches in the wiring harness are required to interface with the various in-vehicle networks. Accordingly, it is desirable to provide a vehicle diagnostics interface adapter that is capable of switching vehicle interface connector pins to the various diagnostic scan tool connector pins, requires fewer adapter harnesses and off-board test equipment inserts, has flexibility to accommodate future configuration changes, conserves space and is relatively inexpensive to manufacture.

SUMMARY OF THE INVENTION

The foregoing needs are met, to a great extent, by the present invention, wherein in one aspect an apparatus and method are provided that in some embodiments provides a vehicle diagnostics interface adapter incorporated in a single integrated circuit that switches signals from the various pins on a vehicle interface connector to the various output pins on a vehicle diagnostics scan tool.

In accordance with one aspect of the present invention, a dynamically reconfigurable mixed-signal device includes a semiconductor substrate with a first gateway conductor integrated on the semiconductor substrate. The mixed-signal device also includes a plurality of solid-state switching devices integrated on the semiconductor substrate, including a first group wherein each of the switching devices is coupled to the first gateway conductor.

In addition, the mixed-signal device includes a plurality of bidirectional contacts, each coupled to one of the plurality of switching devices, including a first set and a vehicle set. Each of the contacts of the first set is coupled to one of the switching devices of the first group, and each of the contacts of the vehicle set correlates to one of a plurality of vehicle interface connector pins.

Further in accordance with this aspect, any one of the first set of contacts can be linked to any other one of the first set of contacts by closing a first corresponding switch of the first group of switching devices that links the any one of the first set of contacts to the first gateway conductor and closing a second corresponding switch of the first group of switching devices that links the any other one of the first set of contacts to the first gateway conductor. The mixed-signal device thus facilitates dynamically reconfigurable interconnection of any one of the plurality of vehicle interface connector pins that correlates to any one of the first set of contacts to any other one of the first set of contacts.

In accordance with another aspect of the present invention, a dynamically reconfigurable mixed-signal device includes a semiconductor substrate with a first gateway conductor and a second gateway conductor integrated on the semiconductor substrate. A plurality of pairs of solid-state vehicle-side switching devices are integrated on the semiconductor substrate, each such pair consisting of a first vehicle-side switching device coupled to the first gateway conductor and a second vehicle-side switching device coupled to the second gateway conductor. In addition, a plurality of pairs of solid-state tool-side switching devices are integrated on the semiconductor substrate, each such pair consisting of a first tool-side switching device coupled to the first gateway conductor and a second tool-side switching device coupled to the second gateway conductor.

Further in accordance with this aspect, a switch control module also is integrated on the semiconductor substrate and is coupled to the vehicle-side switching devices and to the tool-side switching devices to control the vehicle-side switching devices and the tool-side switching devices. Likewise, a bus interface module is integrated on the semiconductor substrate and is coupled to the switch control module to provide a communications interface between the switch control module and at least an interconnect bus.

Furthermore, in accordance with this aspect, the mixed-signal device includes a plurality of bidirectional vehicle-side contacts, each of which correlates to one of a plurality of vehicle interface connector pins, and each of which is coupled to the first and second vehicle-side switching devices of one of the plurality of pairs of vehicle-side switching devices. Similarly, a plurality of pairs of bidirectional tool-side contacts each is coupled to one of the tool-side switching devices, and each pair correlates to a first transmission line and to a second transmission line, which are coupled to one of a plurality of vehicle communication network protocol interface circuits in a vehicle diagnostics tool.

In accordance with this aspect, any two of the plurality of vehicle-side contacts can be linked to any one of the plurality of pairs of tool-side contacts by closing the first and second tool-side switching devices coupled to the any one of the plurality of pairs of tool-side contacts, closing the first vehicle-side switching device coupled to one of the any two of the plurality of vehicle-side contacts and closing the second vehicle-side switching device coupled to another of the any two of the plurality of vehicle-side contacts. In this way, the mixed-signal device facilitates dynamically reconfigurable interconnection of any two of the plurality of vehicle interface connector pins to the first transmission line and to the second transmission line of any one of the plurality of vehicle communication network protocol interface circuits in the vehicle diagnostics tool.

In accordance with yet another aspect of the present invention, a dynamically reconfigurable mixed-signal device includes first means for receiving a first electrical signal and second means for receiving a second electrical signal, the first means for receiving correlating to a first vehicle interface connector pin and the second means for receiving correlating to a second vehicle interface connector pin. The mixed-signal device also includes integrated-circuit means for selectively linking the first means for receiving either to a first gateway conductor or to a second gateway conductor and integrated-circuit means for selectively linking the second means for receiving either to the first gateway conductor or to the second gateway conductor.

In addition, the mixed-signal device includes first means for sending the first electrical signal and second means for sending the second electrical signal, the first means for sending correlating to a first transmission line coupled to a vehicle communication network protocol interface circuit in a vehicle diagnostics tool and the second means for sending correlating to a second transmission line coupled to a vehicle communication network protocol interface circuit in the vehicle diagnostics tool. Furthermore, the mixed-signal device includes integrated-circuit means for selectively linking the first gateway conductor to the first means for sending, as well as integrated-circuit means for selectively linking the second gateway conductor to the second means for sending. Thus, the mixed-signal device facilitates dynamically reconfigurable interconnection of the first and second vehicle interface connector pins to the first and second transmission lines of the vehicle communication network protocol interface circuit in the vehicle diagnostics tool.

In accordance with still another aspect of the present invention, a method of adapting a vehicle diagnostics tool interface includes the steps of receiving a first electrical signal, correlating to a first vehicle interface connector pin; receiving a second electrical signal, correlating to a second vehicle interface connector pin; selectively switching the first electrical signal to a first gateway conductor; selectively switching the second electrical signal to a second gateway conductor; selectively switching the first gateway conductor to a first transmission interface contact correlating to a vehicle communication network protocol interface circuit in a vehicle diagnostics tool; and selectively switching the second gateway conductor to a second transmission interface contact correlating to the vehicle communication network protocol interface circuit in the vehicle diagnostics tool. The method of adapting a vehicle diagnostics tool thus facilitates dynamically reconfigurable interconnection of the first and second vehicle interface connector pins to the vehicle communication network protocol interface circuit in the vehicle diagnostics tool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
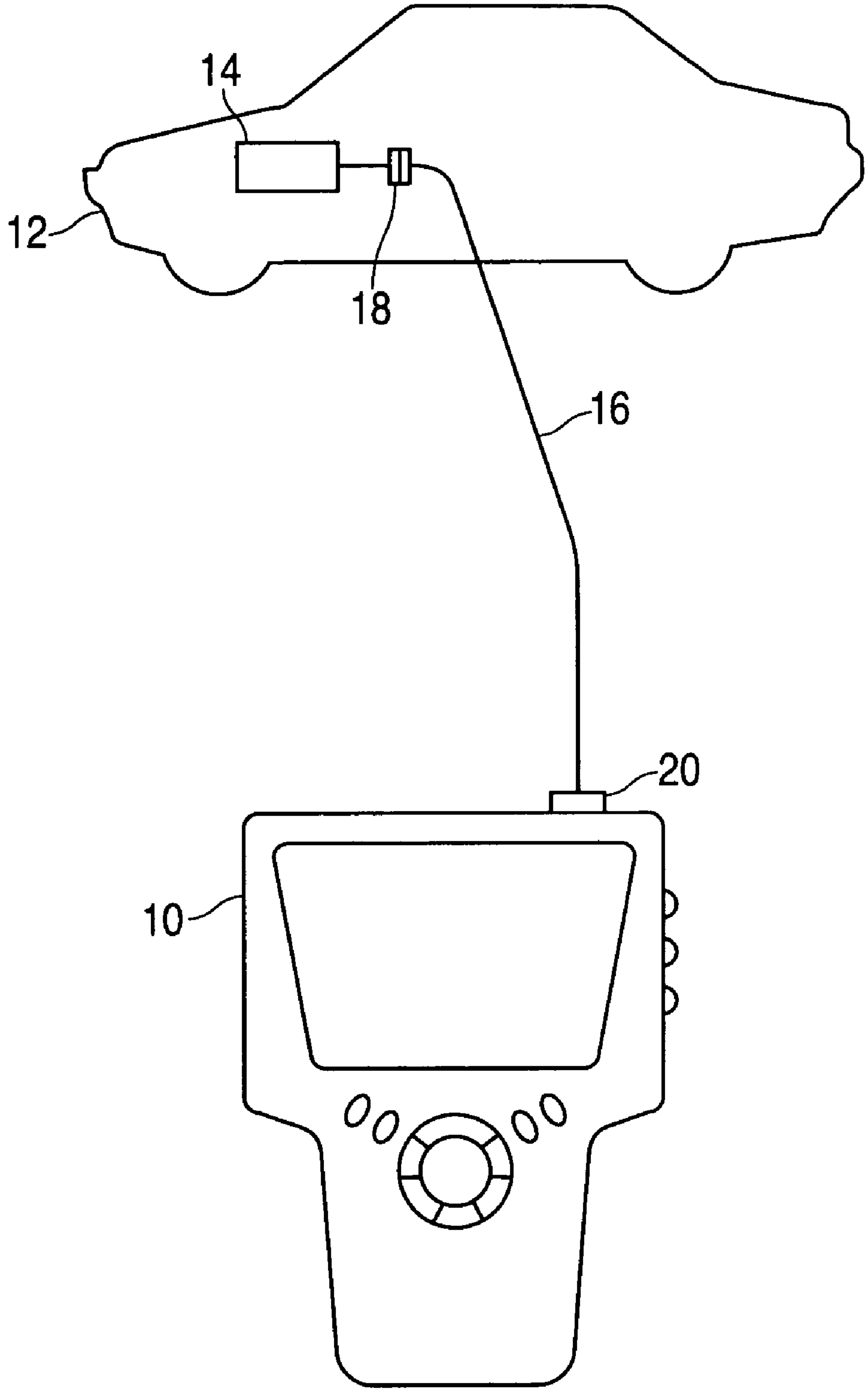
FIG. 1 is a diagrammatic representation illustrating an interface between a vehicle diagnostics scan tool and a vehicle onboard computer.

The invention will now be described with reference to the drawing figures, in which like reference numerals refer to like parts throughout. FIG. 1 illustrates the interface between a handheld diagnostics scan tool 10 and a vehicle 12 onboard computer 14. The vehicle diagnostics scan tool 10 is linked to the onboard computer 14 by way of an interface wiring harness 16, which connects to an onboard computer communications input/output (I/O) connector, or vehicle interface connector, 18, and to a vehicle diagnostic scan tool I/O connector 20.

An example of a suitable vehicle diagnostics scan tool compatible with an embodiment of the present invention is the Genisys™ scan tool, manufactured by the OTC Division of the SPX Corporation in Owatonna, Minn. A variety of features of the Genisys™ system are disclosed in U.S. patents, such as U.S. Pat. Nos. 6,640,166, 6,538,472 and 6,662,087, the disclosures of which are incorporated herein by reference in their entirety, and in co-pending U.S. patent applications, such as Ser. Nos. 09/702,751 and 09/468,231, the disclosures of which also are incorporated herein by reference in their entirety. However, other embodiments are compatible with additional vehicle diagnostic tools, including any number of commercially available makes and models, such as the SUPER AutoScanner and the EZ 3/4/5/6000 Scan Tools, also manufactured by the the SPX Corporation; the StarSCAN scan tool, manufactured for DaimlerChrysler Corporation by SPX; or the Snap-on Scanner, MicroSCAN, MODIS, or SOLUS series, manufactured by Snap-on Technologies, Inc.; or any other device capable of receiving and processing vehicle diagnostic data from a vehicle onboard computer, such as a personal computer (PC) or a personal digital assistant (PDA).

Onboard computers 14 in various vehicles 12 can use a variety of network communication protocols, or standards, to communicate with diagnostics scan tools 10. Some of the network communication protocols have been established by standards organizations, such as the Society of Automotive Engineers (SAE) J1850 Variable Pulse Width (VPW) protocol standard, the SAE J1850 Pulse Width Modulation (PWM) protocol standard, or the International Organization for Standardization (ISO) 9141-2 protocol standard. Other network communication protocols have been established by manufacturer specifications, such as the Ford Standard Corporate Protocol (SCP), the Chrysler Collision Detection (CCD) protocol, the DaimlerChrysler Scalable Coherent Interface (SCI) protocol, the General Motors (GM) 8192 Universal Serial Receiver/Transmitter (UART) or Assembly Line Diagnostic Link (ALDL) protocol, the Bosch Controller Area Network (CAN) protocol (incorporated into ISO 11898), the Ford Data Communication Link (DCL) protocol, and the like.

Figure 2:
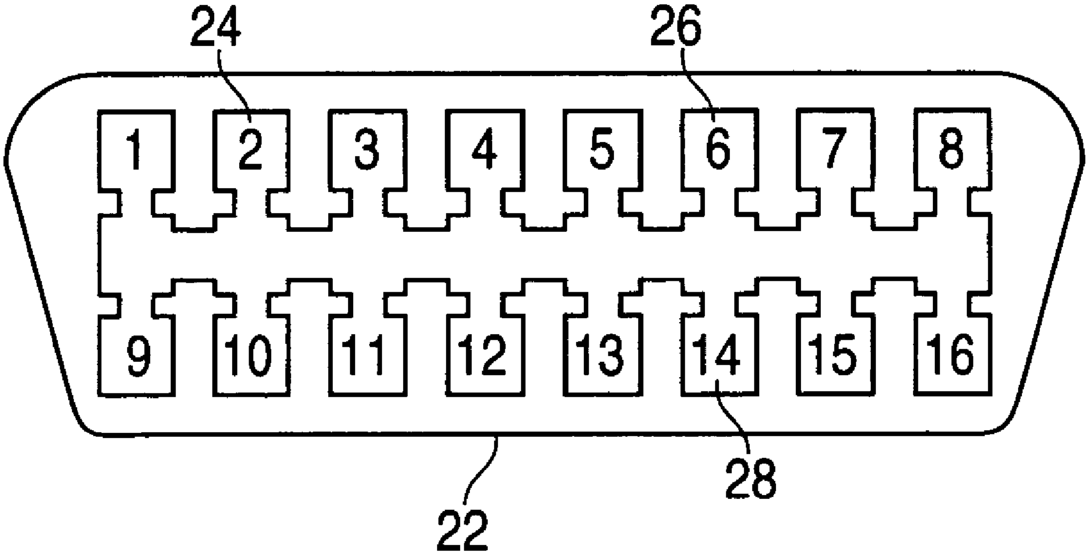
FIG. 2 is a pin layout diagram of an SAE J1962 connector.

The onboard computer vehicle interface connector 18 in most vehicles manufactured since 1996 is an SAE J1962 connector. FIG. 2 shows the pin layout of an SAE J1962 wiring connector 22, required in On-Board Diagnostics (OBD) systems since 1996. The J1962 connector is a sixteen-pin wiring connector with pins one through eight laterally aligned across an upper portion of the connector interface, and pins nine through sixteen laterally aligned across a lower portion of the connector interface. However, in other vehicles, including most pre-1996 manufactured vehicles, the vehicle interface connector 18 may include any suitable communications wiring connector.

Even though the J1962 connector has been installed on most vehicles since 1996, vehicles produced by the various manufacturers can transmit and receive in-vehicle network communications on different pins. For example, a control module in a vehicle produced by one manufacturer may utilize pin two 24 to send and receive an ISO 9141-2 communications protocol "positive" signal, while a vehicle produced by another manufacturer may utilize pin six 26 to send the same signal or pin two 24 to send another signal. In addition, communications from different onboard control modules in a particular vehicle may be input and output on different pins using the same communications protocol. For example, an airbag module may utilize pin two 24 to transmit and receive a J1850 VPW communication signal, while a body controller on the same vehicle may transmit and receive a J1850 VPW signal on pin six 26.

As a result when a vehicle diagnostics scan tool 10 is connected to a vehicle 12, input/output communications may arrive at the vehicle diagnostics scan tool I/O connector 20 on different pins, depending on the vehicle manufacturer, or different communications protocols may arrive on the same pin, depending on the vehicle 12 manufacturer. Thus, when a vehicle diagnostics scan tool 10 is connected to a vehicle 12 by way of a interface wiring harness 16, the data received on the scan tool I/O connector 20 must be routed to the correct internal communications protocol circuitry in the vehicle diagnostics scan tool 10.

Figure 3:
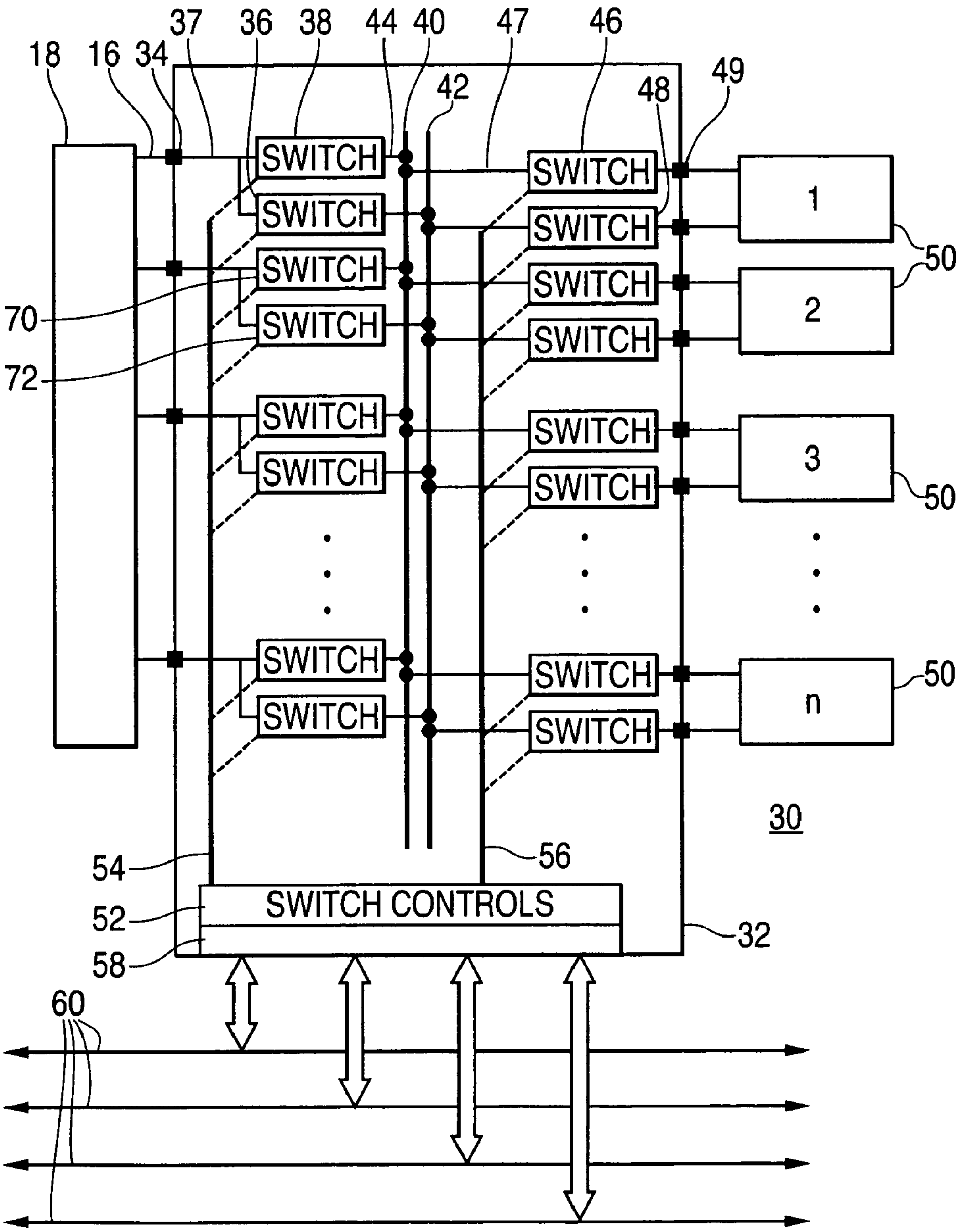
FIG. 3 is a diagrammatic representation illustrating an integrated circuit vehicle diagnostics interface adapter according to a preferred embodiment of the invention.

An exemplary embodiment in accordance with the present inventive apparatus and method is illustrated in FIG. 3, in which an integrated circuit vehicle diagnostics interface adapter 30 receives data from a vehicle interface connector 18 by way of an interface wiring harness 16. The input data is routed to an integrated circuit on a semiconductor substrate 32 by way of a set of vehicle-side bidirectional contacts 34, each of which is coupled to a pair of solid-state vehicle-side switches 36, 38 integrated upon the semiconductor substrate 32 by an integrated wire 37 on the semiconductor substrate. The vehicle-side switches 36, 38 can be capable of transmitting electrical signals with voltage levels up to and including the vehicle system voltage, for example, 12 volts. Thus, the vehicle diagnostics interface adapter 30 can be a mixed-signal, or hybrid, integrated circuit. The vehicle-side switches 36, 38 can include any suitable integrated circuit switch design, such as a bipolar transistor, a transistor-transistor logic (TTL), an enhancement or depletion n-type metal-oxide-silicon field effect transistor (MOSFET), or an enhancement or depletion p-type MOSFET, a combination of these, or the like.

One of each pair of the vehicle-side switches 36, 38 is coupled to one of two physical gateway conductors 40, 42 by an integrated wire 44 on the semiconductor substrate 32. Each of the two physical gateway conductor conductors 40, 42 is in turn coupled to one of each pair of a set of paired solid-state tool-side switches 46, 48, by an integrated wire 47 on the semiconductor substrate 32. Here again, the tool-side switches 46, 48 can be capable of transmitting electrical signals with voltage levels up to and including the vehicle system voltage, for example, 12 volts. Thus, the vehicle diagnostics interface adapter 30 can be a mixed-signal, or hybrid, integrated circuit. The tool-side switches 46, 48 can include any suitable integrated circuit switch design, such as a bipolar transistor, a transistor-transistor logic (TTL), an enhancement or depletion n-type metal-oxide-silicon field effect transistor (MOSFET), or an enhancement or depletion p-type MOSFET, a combination of these, or the like. Each of the tool-side switches 46, 48 is coupled to an individual tool-side bidirectional contact 49. Each pair of the tool-side bidirectional contacts 49 associated with a pair of tool-side switches 46, 48 is linked to a vehicle diagnostics scan tool I/O circuit 50 configured to send and receive a specific communications protocol.

Thus, the vehicle diagnostics interface adapter 30 can link any two pins on the vehicle interface connector 18 to any one of the communications protocol I/O circuits 50. This is accomplished by linking one of the two vehicle-side bidirectional contacts 34 associated with one of the two pins on the vehicle interface connector 18 to the gateway conductor 40 or 42 associated with the corresponding communications protocol signal (high/positive or low/negative) and the other vehicle-side bidirectional contact 34 associated with the other of the two pins on the vehicle interface connector 18 to the other gateway conductor 42 or 40, via one of the vehicle-side switches 36, 38, and thereby to a tool-side bidirectional contact 49 via one of the switches 46, 48.

Thus, in an exemplary embodiment of the invention, the integrated circuit vehicle diagnostics interface adapter 30 preferably includes a number of vehicle-side switches 36, 38 that is at least twice the number of pins on the vehicle interface connector 18 that require switching. In a similar manner, the number of tool-side switches 46, 48 preferably is at least twice the number of communication protocols that the vehicle diagnostics scan tool 10 is configured to transmit and receive. For example, if a vehicle diagnostics scan tool 10 is configured to communicate using three different communication protocols 50, as shown in FIG. 3, the vehicle diagnostics interface adapter 30 preferably includes at least six switches 40. In various embodiments of the invention, the integrated circuit 32 may include any appropriate number of switches 40 equal to twice the number of communication protocols 50 implemented in the vehicle diagnostics scan tool 10. Nevertheless, an embodiment of the invention may include any number of vehicle-side switches 36, 38 and any number of tool-side switches.

The vehicle diagnostics interface adapter 30 also includes a switch control module, or circuit, 52, integrated on the semiconductor substrate 32, which is linked to the vehicle-side switches 36, 38 by a control bus 54, integrated on the semiconductor substrate 32, and to the tool-side switches 46, 48 by a second control bus 56. The switch control circuit 52 also is linked to a switch control bus interface 58 that communicates with the various system buses 60, through which the switch control circuit 52 receives data regarding the vehicle type or vehicle interface connector 18 configuration. For example, in a preferred embodiment, the bus interface 58 communicates with other system modules by way of a serial peripheral interface (SPI) bus 60. In other embodiments of the invention, the bus interface 58 can communicate with any suitable bus interface, such as an inter-integrated circuit ($I^2C$) serial data bus, a parallel bus, a universal serial bus (USB), or a wireless communication interface.

In a particular embodiment, the I/O circuits 50 can include any combination of vehicle network communication protocol circuits, such as J1850 VPW, J1850 PWM, ISO 9141-2, CAN, SCP, CCD, SCI, GMUART or ALDL, DCL, or the like. Various embodiments of the invention may include any suitable combination of network communication protocol I/O circuits.

The embodiment shown in FIG. 3 includes two physical gateway conductors 40, 42. This preferred embodiment is compatible with most vehicle network communication protocols, since most protocols require one or two signal carrying conductors. However, alternative embodiments of the invention include any number of physical gateway conductors, such that any communication protocol may be accommodated or multiple communication protocols may be simultaneously transmitted over redundant physical gateway networks. For example, an alternative embodiment includes three gateway conductors, so that the vehicle diagnostics interface adapter 30 is compatible with any communication protocol requiring that signals be carried on three separate wires. As a further example, another alternative embodiment includes four gateway conductors, so that two different communication protocols can be simultaneously transmitted, for example, a CAN network signal and an ISO 9141-2 network signal, each using two physical gateways.

As a specific example of the implementation of an embodiment of the invention, a vehicle includes an onboard computer 14 and a DSL 18 in accordance with the SAE J1962 connector standard as shown in FIG. 2. In this example, the onboard computer 14 is configured to transmit and receive a CAN protocol high signal on pin six 26, and a CAN protocol low signal on pin fourteen 28. The CAN high signal arrives at vehicle diagnostics interface adapter 30 via the vehicle-side bidirectional contact 34 corresponding to pin six 26. The switch control circuit 52 receives data regarding the vehicle type from a system bus by way of the switch control bus interface 58, and commands one of a pair of vehicle-side switches 38 to open and the other of the pair of vehicle-side switches 36 to close, by way of the control bus 54 linking the CAN high signal to one of the physical gateway vehicle-side conductors 42. The CAN low signal arrives via the vehicle-side bidirectional contact 34 corresponding to pin fourteen 28 and is routed to a second pair of vehicle-side switches 70, 72. The switch control circuit 52 commands the first of the pair of vehicle-side switches 70 to close and the second of the pair of vehicle-side switches 72 to open by way of control bus 54. Thus, the CAN low signal is routed to the other physical gateway 40 on the integrated circuit.

The switch control circuit 52 also commands the two tool-side switches 46, 48 associated with the protocol circuits 50 high and low signals to close linking the gateway conductors 40, 42 to the corresponding CAN protocol high and low signal circuit. In this way, the vehicle DSL 18 pin two 14 and fourteen 28 are connected to the vehicle diagnostics scan tool I/O connector 20 pin associated with the scan tool CAN protocol circuitry 50.

The example embodiment of the vehicle diagnostics interface adapter 30 above interfaces with a wiring harness 16 that is compatible with the SAE J1962 standard connector 22. In a similar manner, other embodiments of the invention interface with additional wiring harnesses 16 that are compatible with other configurations of vehicle interface connectors 18. In conjunction with additional wiring harnesses 16, the vehicle diagnostics interface adapter 30 is compatible with vehicle interface connectors 18 for a variety of different vehicle makes and models produced by different manufacturers, including vehicles produced before 1996 that do not include an SAE J1962 connector 22. The integrated circuit vehicle diagnostics interface adapter 30 thus has the advantage that a single vehicle diagnostics scan tool 10 may be used with virtually all makes and models of cars and light trucks, including pre-1996 vehicles as well as post-1996 OBD compliant vehicles, by using a relatively small number of wiring harnesses 16, each configured to mate with a different vehicle interface connector 18. The pins utilized for network communications on a particular vehicle make and model are multiplexed by the vehicle diagnostics interface adapter 30 to match the pins utilized on a particular vehicle diagnostics scan tool I/O connector 20 by configuring the various vehicle-side and tool-side switches 36, 38, 40, 42 in the vehicle diagnostics interface adapter 30.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dynamically reconfigurable mixed-signal device, comprising:

a semiconductor substrate;

a first gateway conductor integrated on the semiconductor substrate;

a plurality of solid-state switching devices integrated on the semiconductor substrate, including a first group wherein each of the switching devices of the first group is coupled to the first gateway conductor; and a plurality of bidirectional contacts, each coupled to one of the plurality of switching devices, including a first set and a vehicle set, wherein each of the contacts of the first set is coupled to one of the switching devices of the first group, and wherein each of the contacts of the vehicle set correlates to one of a plurality of vehicle interface connector pins;

wherein any one of the first set of contacts can be linked to any other one of the first set of contacts by closing a first corresponding switch of the first group of switching devices that links the any one of the first set of contacts to the first gateway conductor and closing a second corresponding switch of the first group of switching devices that links the any other one of the first set of contacts to the first gateway conductor;

thereby facilitating dynamically reconfigurable interconnection of any one of the plurality of vehicle interface connector pins that correlates to any one of the first set of contacts to any other one of the first set of contacts.

2. The dynamically reconfigurable mixed-signal device of claim 1, further comprising a switch control module integrated on the semiconductor substrate, the switch control module being coupled to the plurality of switching devices to control the plurality of switching devices.

3. The dynamically reconfigurable mixed-signal device of claim 2, further comprising a bus interface module integrated on the semiconductor substrate, the bus interface module being coupled to the switch control module to provide a communications interface between the switch control module and at least an interconnect bus.

4. The dynamically reconfigurable mixed-signal device of claim 1, wherein each of the plurality of switching devices is coupled to one and only one of the plurality of contacts.

5. The dynamically reconfigurable mixed-signal device of claim 1, wherein each of the contacts of the vehicle set correlates to one and only one of a plurality of vehicle interface connector pins.

6. The dynamically reconfigurable mixed-signal device of claim 1, wherein each of the contacts of the vehicle set correlates to one and only one of a plurality of pins on a vehicle interface connector configured substantially in accordance with a Society of Automotive Engineers (SAE) J1962 standard.

7. The dynamically reconfigurable mixed-signal device of claim 1, wherein the plurality of solid-state switching devices and the plurality of bidirectional contacts are configured to transmit an electrical signal having an electrical potential equal to that of a vehicle electrical system.

8. The dynamically reconfigurable mixed-signal device of claim 1, wherein the plurality of contacts further includes a tool set, and each of the contacts of the tool set correlate to one of a plurality of vehicle communication network protocol interface circuits in a vehicle diagnostics tool, and the vehicle set and the tool set are mutually exclusive;

thereby facilitating dynamically reconfigurable interconnection of any one of the plurality of vehicle interface connector pins that correlates to any one of the first set of contacts to any one of the plurality of vehicle communication network protocol interface circuits in the vehicle diagnostics tool that correlates to any other one of the first set of contacts.

9. The dynamically reconfigurable mixed-signal device of claim 8, wherein at least one contact of the tool set correlates to a vehicle-based controller area network (CAN) protocol interface circuit in a vehicle diagnostics tool.

10. The dynamically reconfigurable mixed-signal device of claim 8, wherein at least one contact of the tool set correlates to a Chrysler Collision Detection (CCD) protocol interface circuit in a vehicle diagnostics tool.

11. The dynamically reconfigurable mixed-signal device of claim 8, wherein at least one contact of the tool set correlates to a vehicle-based communication network protocol interface circuit in a vehicle diagnostics tool, the communication network protocol being substantially in accordance with an International Standards Organization (ISO) 9141-2 standard.

12. The dynamically reconfigurable mixed-signal device of claim 8, wherein at least one contact of the tool set correlates to one of the following vehicle-based communication network protocol interface circuits: Society of Automotive Engineers (SAE) J1850 Variable Pulse Width (VPW), SAE J1850 Pulse Width Modulation (PWM), International Organization for Standardization (ISO) 9141-2, Controller Area Network (CAN), Ford Standard Corporate Protocol (SCP), Chrysler Collision Detection (CCD), DaimlerChrysler Scalable Coherent Interface (SCI), General Motors (GM) 8192 Universal Serial Receiver/Transmitter (UART) or Assembly Line Diagnostic Link (ALDL), Bosch Controller Area Network (CAN), Ford Data Communication Link (DCL).

13. The dynamically reconfigurable mixed-signal device of claim 8, further comprising a second gateway conductor integrated on the semiconductor substrate, the plurality of switching devices further including a second group wherein each of the switching devices of the second group is coupled to the second gateway conductor, the first group and the second group being mutually exclusive, and the plurality of contacts further including a second set wherein each of the contacts of the second set is coupled to one of the switching devices of the second group;

wherein any one of the second set of contacts can be linked to any other one of the second set of contacts by closing a third corresponding switch of the second group of switching devices that links the any one of the second set of contacts to the second gateway conductor and closing a fourth corresponding switch of the second group of switching devices that links the any other one of the second set of contacts to the second gateway conductor;

thereby further facilitating dynamically reconfigurable interconnection of any one of the plurality of vehicle interface connector pins that correlates to any one of the second set of contacts to any one of the plurality of vehicle communication network protocol interface circuits in the vehicle diagnostics tool that correlates to any other one of the second set of contacts.

14. The dynamically reconfigurable mixed-signal device of claim 13, wherein each of the contacts of the vehicle set is coupled to one of the switching devices of the first group and to one of the switching devices of the second group, such that any one of the contacts of the vehicle set can be linked either to the first gateway conductor or to the second gateway conductor by closing either a fifth corresponding switch of the first group of switching devices or a sixth corresponding switch of the second group of switching devices, respectively;

thereby facilitating dynamically reconfigurable interconnection of any one of the plurality of vehicle interface connector pins to any one of the plurality of vehicle communication network protocol interface circuits in the vehicle diagnostics tool that correlates either to any one of the first set of contacts or to any one of the second set of contacts.

15. The dynamically reconfigurable mixed-signal device of claim 14, wherein each of the contacts of the tool set that is coupled to one of the switching devices of the first group is paired with one of the contacts of the tool set that is coupled to one of the switching devices of the second group, and each such pair of contacts of the tool set correlates to a pair of transmission lines coupled to one of the plurality of vehicle communication network protocol interface circuits in the vehicle diagnostics tool;

thereby facilitating dynamically reconfigurable interconnection of any two of the plurality of vehicle interface connector pins to any one pair of transmission lines coupled to any one of the plurality of vehicle communication network protocol interface circuits in the vehicle diagnostics tool.

16. A dynamically reconfigurable mixed-signal device, comprising:

a semiconductor substrate;

a first gateway conductor integrated on the semiconductor substrate;

a second gateway conductor integrated on the semiconductor substrate;

a plurality of pairs of solid-state vehicle-side switching devices integrated on the semiconductor substrate, each such pair consisting of a first vehicle-side switching device coupled to the first gateway conductor and a second vehicle-side switching device coupled to the second gateway conductor;

a plurality of pairs of solid-state tool-side switching devices integrated on the semiconductor substrate, each such pair consisting of a first tool-side switching device coupled to the first gateway conductor and a second tool-side switching device coupled to the second gateway conductor;

a switch control module integrated on the semiconductor substrate, the switch control module being coupled to the vehicle-side switching devices and to the tool-side switching devices to control the vehicle-side switching devices and the tool-side switching devices;

a bus interface module integrated on the semiconductor substrate, the bus interface module being coupled to the switch control module to provide a communications interface between the switch control module and at least an interconnect bus;

a plurality of bidirectional vehicle-side contacts, each correlating to one and only one of a plurality of vehicle interface connector pins and each being coupled to the first and second vehicle-side switching devices of one of the plurality of pairs of vehicle-side switching devices; and a plurality of pairs of bidirectional tool-side contacts, each tool-side contact being coupled to one and only one of the tool-side switching devices, and each pair of tool-side contacts correlating to a first transmission line and to a second transmission line, the first and second transmission lines being coupled to one of a plurality of vehicle communication network protocol interface circuits in a vehicle diagnostics tool;

wherein any two of the plurality of vehicle-side contacts can be linked to any one of the plurality of pairs of tool-side contacts by closing the first and second tool-side switching devices coupled to the any one of the plurality of pairs of tool-side contacts, closing the first vehicle-side switching device coupled to one of the any two of the plurality of vehicle-side contacts and closing the second vehicle-side switching device coupled to another of the any two of the plurality of vehicle-side contacts;

thereby facilitating dynamically reconfigurable interconnection of any two of the plurality of vehicle interface connector pins to the first transmission line and to the second transmission line of any one of the plurality of vehicle communication network protocol interface circuits in the vehicle diagnostics tool.

17. A dynamically reconfigurable mixed-signal device, comprising:

first means for receiving a first electrical signal, the first means for receiving correlating to a first vehicle interface connector pin;

second means for receiving a second electrical signal, the second means for receiving correlating to a second vehicle interface connector pin;

integrated-circuit means for selectively linking the first means for receiving either to a first gateway conductor or to a second gateway conductor;

integrated-circuit means for selectively linking the second means for receiving either to the first gateway conductor or to the second gateway conductor;

first means for sending the first electrical signal, the first means for sending correlating to a first transmission line coupled to a vehicle communication network protocol interface circuit in a vehicle diagnostics tool;

second means for sending the second electrical signal, the second means for sending correlating to a second transmission line coupled to a vehicle communication network protocol interface circuit in the vehicle diagnostics tool;

integrated-circuit means for selectively linking the first gateway conductor to the first means for sending; and integrated-circuit means for selectively linking the second gateway conductor to the second means for sending;

thereby facilitating dynamically reconfigurable interconnection of the first and second vehicle interface connector pins to the first and second transmission lines of the vehicle communication network protocol interface circuit in the vehicle diagnostics tool.

18. The dynamically reconfigurable mixed-signal device of claim 17, further comprising integrated-circuit means for controlling the means for selectively linking the first means for receiving, the means for selectively linking the second means for receiving, the means for selectively linking the first gateway conductor, and the means for selectively linking the second gateway conductor.

19. The dynamically reconfigurable mixed-signal device of claim 18, further comprising communication means for connecting the means for controlling to at least an interconnect bus.

20. A method of adapting a vehicle diagnostics tool interface, comprising the steps of:

receiving a first electrical signal, correlating to a first vehicle interface connector pin;

receiving a second electrical signal, correlating to a second vehicle interface connector pin;

selectively switching the first electrical signal to a first gateway conductor;

selectively switching the second electrical signal to a second gateway conductor;

selectively switching the first gateway conductor to a first transmission interface contact correlating to a vehicle communication network protocol interface circuit in a vehicle diagnostics tool; and selectively switching the second gateway conductor to a second transmission interface contact correlating to the vehicle communication network protocol interface circuit in the vehicle diagnostics tool;

thereby facilitating dynamically reconfigurable interconnection of the first and second vehicle interface connector pins to the vehicle communication network protocol interface circuit in the vehicle diagnostics tool.

21. The method of claim 20, further comprising the step of receiving control signals from at least an interconnect bus.

* * * * *